US012043394B2

(12) United States Patent
Benjamin et al.

(10) Patent No.: US 12,043,394 B2
(45) Date of Patent: Jul. 23, 2024

(54) EJECTION SEAT ACTIVE ROLL CORRECTION

(71) Applicant: Rockwell Collins, Inc., Cedar Rapids, IA (US)

(72) Inventors: Jeff Benjamin, Colorado Springs, CO (US); Matthew H. Hartman, Peyton, CO (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 60 days.

(21) Appl. No.: 17/902,726

(22) Filed: Sep. 2, 2022

(65) Prior Publication Data

US 2024/0076048 A1 Mar. 7, 2024

(51) Int. Cl.
*B64D 25/10* (2006.01)
*G05D 1/00* (2024.01)

(52) U.S. Cl.
CPC ........... *B64D 25/10* (2013.01); *G05D 1/0808* (2013.01)

(58) Field of Classification Search
CPC .................................................... B64D 25/10
See application file for complete search history.

(56) References Cited

U.S. PATENT DOCUMENTS

| 4,236,687 A | 12/1980 | Stone et al. |
| 4,721,273 A * | 1/1988 | Trikha ................... B64D 25/10 244/141 |
| 4,749,154 A | 6/1988 | Herndon et al. |
| 7,578,472 B2 | 8/2009 | Mastrolia |
| 10,344,712 B2 | 7/2019 | Ruff |
| 11,338,924 B2 | 5/2022 | Mastrolia |
| 2022/0033096 A1 | 2/2022 | Holstine et al. |

FOREIGN PATENT DOCUMENTS

CN 109466778 3/2019

OTHER PUBLICATIONS

United Kingdom Intellectual Property Office, United Kingdom Search Report dated Feb. 7, 2024 in Application No. GB2313390.3.

* cited by examiner

*Primary Examiner* — Timothy D Collins
*Assistant Examiner* — Eric Acosta
(74) *Attorney, Agent, or Firm* — SNELL & WILMER L.L.P.

(57) ABSTRACT

A roll stabilization system for an aircraft ejection seat may be provided. An integral seat sequencer may activate an ejection sequence causing an aircraft ejection seat to be ejected from an aircraft. In various instances, particularly with lighter occupants of the aircraft ejection seat, the aircraft ejection seat may begin a rotational movement. To ameliorate this rotational movement, a roll correction rocket motor is installed on the aircraft ejection seat and selectively activated by the integral seat sequencer in the event that an undesired rotational movement is detected.

19 Claims, 6 Drawing Sheets

EJECTION SEAT ACTIVE ROLL CORRECTION

FIELD

The present disclosure relates generally to ejection seats, and more particularly, to roll stabilization features for ejection systems.

BACKGROUND

Current ejection seats utilize a high energy catapult device (sometimes referred to as a rocket-catapult assembly) to expel the ejection seat from an aircraft. The high energy catapult device is an energetic device that expels the ejection seat and any occupant of the ejection seat from the aircraft cockpit and propels the ejection seat and its occupant to a height associated with safe parachute recovery. Current ejection seats also include a trajectory divergence rocket motor to modify the trajectory of an ejection seat away from aircraft structures and/or other ejection seats also ejecting from the same aircraft. However, trajectory divergence rocket motors may introduce a rotational movement to the ejection seat as the ejection seat travels, particularly when the ejection seat has a relatively lighter weight occupant. This rotational movement may cause injury to the occupant or may cause the ejection seat to travel along an undesired path.

SUMMARY

A roll stabilized aircraft ejection seat is provided. The seat may have a seat bucket configured to support an occupant. The seat may have a seat back extending away from the seat bucket to support a back of the occupant. The seat may also include a high energy catapult device, a trajectory divergence rocket motor, and an active roll correction rocket motor. The high energy catapult device may be configured to expel the ejection seat from an aircraft along a first trajectory in response to a first actuation signal from an integral seat sequencer. The trajectory divergence rocket motor may be attached to the seat bucket and may be configured to modify the trajectory of the ejection seat in response to a second actuation signal from the integral seat sequencer attached to the seat so that the ejection seat travels along a second trajectory. The active roll correction rocket motor may be attached to the seat bucket and may be configured to ameliorate a rotational movement of the ejection seat in response to a third actuation signal from the integral seat sequencer.

In various embodiments, other aspects are contemplated. For example, the trajectory divergence rocket motor may be positioned toward a first side of the seat bucket and the active roll correction rocket motor is positioned toward a second side of the seat bucket opposite the first side of the seat bucket. The active roll correction rocket motor may ameliorate rotational movement of the ejection seat imparted by the trajectory divergence rocket motor. The integral seat sequencer may be a controller attached to the roll stabilized aircraft ejection seat and connected to the high energy catapult device, the trajectory divergence rocket motor, and the active roll correction rocket motor to transmit the first actuation signal, the second actuation signal, and the third actuation signal. A pitch stabilization and control assembly (STAPAC) device may be included. The STAPAC device may include a rocket motor centered between the trajectory divergence rocket motor and the active roll correction rocket motor to increase a separation of the roll stabilized aircraft ejection seat from the aircraft (such as by enhancing pitch stability and/or control) following the expelling of the ejection seat from the aircraft.

In various embodiments, the integral seat sequencer includes a controller and a sensor providing a first data to the controller, and wherein the integral seat sequencer selectively transmits the third actuation signal to the active roll correction rocket motor in response to the first data exceeding a first magnitude. The first data may be data indicative of an acceleration and/or an angular rate. The integral seat sequencer may include a controller and a sensor providing the first data to the controller, and the integral seat sequencer may selectively transmit the third actuation signal to the active roll correction rocket motor in response to the first data indicating a rotational movement of the seat back concentrically about the seat bucket in a first direction. Moreover, the trajectory divergence rocket motor and the active roll correction rocket motor may be similar rocket motors. The trajectory divergence rocket motor and the active roll correction rocket motor may be same rocket motors positioned on opposite sides of the seat bucket. The high energy catapult device may be a rocket motor attached to the seat back.

A roll stabilization system is provided for installation on an aircraft ejection seat having a high energy catapult device configured to expel the ejection seat from an aircraft. The roll stabilization system may include a pair of rocket motors both attached to a seat bucket of the ejection seat. A first rocket motor of the pair of rocket motors may be a trajectory divergence rocket motor attached to the seat bucket and configured to impel the ejection seat in a direction away from at least one of (1) the aircraft and (2) a second aircraft ejection seat of the aircraft. The second rocket motor of the pair of rocket motors may be an active roll correction rocket motor configured to ameliorate a rotational movement of the aircraft ejection seat induced by the first rocket motor.

In various embodiments, one or more other aspect may be contemplated. For instance, the pair of rocket motors may be identical motors installed on opposite sides of an underside of the seat bucket of the ejection seat. The first rocket motor may be positioned toward a first side of the seat bucket and the second rocket motor may be positioned toward a second side of the seat bucket opposite the first side of the seat bucket. An integral seat sequencer may be provided and may include a controller and a sensor providing a first data to the controller, wherein the integral seat sequencer selectively activates the second rocket motor in response to the first data exceeding a first magnitude in a first direction. The first data may be data indicative of an acceleration and/or an angular rate. The sensor may be a roll sensor, such as an accelerometer, attached to the aircraft ejection seat. The first rocket motor and the second rocket motor may be identical motors.

A computer-readable medium may be provided. The medium may store instructions that when executed by a controller cause the controller to perform a method for roll stabilization of an aircraft ejection seat having a seat bucket configured to support an occupant and a seat back extending away from the seat bucket to support a back of the occupant. The method may include sending, by an integral seat sequencer, a first actuation signal to a high energy catapult device configured to expel the ejection seat from an aircraft along a first trajectory. The method may include sending, by the integral seat sequencer, a second actuation signal from the integral seat sequencer to a trajectory divergence rocket motor attached to the seat bucket and configured to modify the first trajectory of the ejection seat so that the ejection seat travels along a second trajectory. The method may include sensing, by a sensor of the integral seat sequencer, a first movement of the ejection seat. The method may include determining, by the integral seat sequencer, a direction and a magnitude of the first movement, such as a direction and a magnitude of a roll rate and/or an acceleration such as an angular acceleration. The method may include conducting a first comparison including comparing, by the integral seat sequencer, the direction to a first prohibited direction. The method may include conducting a second comparison including comparing, by the integral seat sequencer, the magnitude to a first roll rate limit. The method may include determining, by the integral seat sequencer, an active roll correction rocket motor status in response to the first comparison and the second comparison.

In various instances, the method further includes sending, by the integral seat sequencer, a third actuation signal to an active roll correction rocket motor attached to the seat bucket, in response to the first comparison indicating that the direction is the first prohibited direction and in response to the second comparison indicating that the magnitude exceeds the first roll rate limit. Moreover, in various instances, the method may include activating the active roll correction rocket motor in response to receiving by the active roll correction rocket motor, the third actuation signal. The activating the roll correction rocket motor may be after an activating of the trajectory divergence rocket motor. The sensing the first acceleration may be during travel of the ejection seat along the second trajectory.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
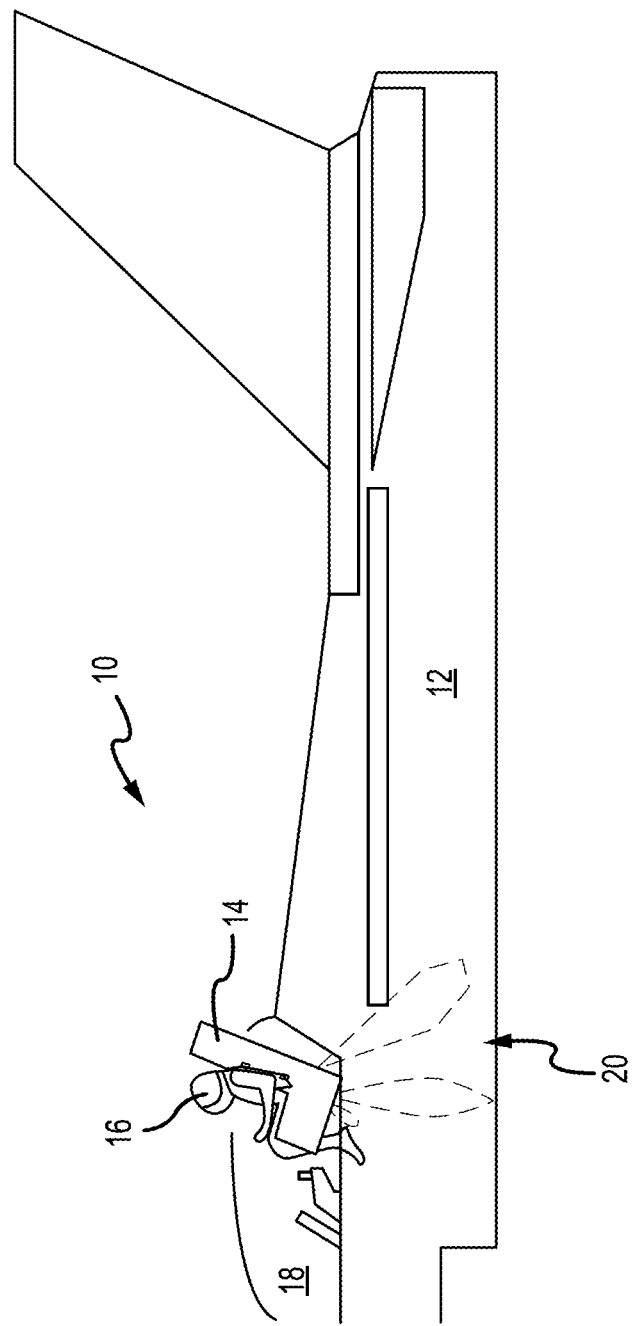
FIG. 1 illustrates an ejection seat being expelled from an aircraft, in accordance with various embodiments.

With reference to FIG. 1, a roll-stabilized aircraft ejection system 10 is shown, in accordance with various embodiments. The roll-stabilized aircraft ejection system 10 may be installed in aircraft 12 to expel an ejection seat 14 and an occupant 16 of the ejection seat 14 from a cockpit 18 of the aircraft 12. The ejection seat 14 may be urged from cockpit 18 by a propellant 20.

Figure 2A:
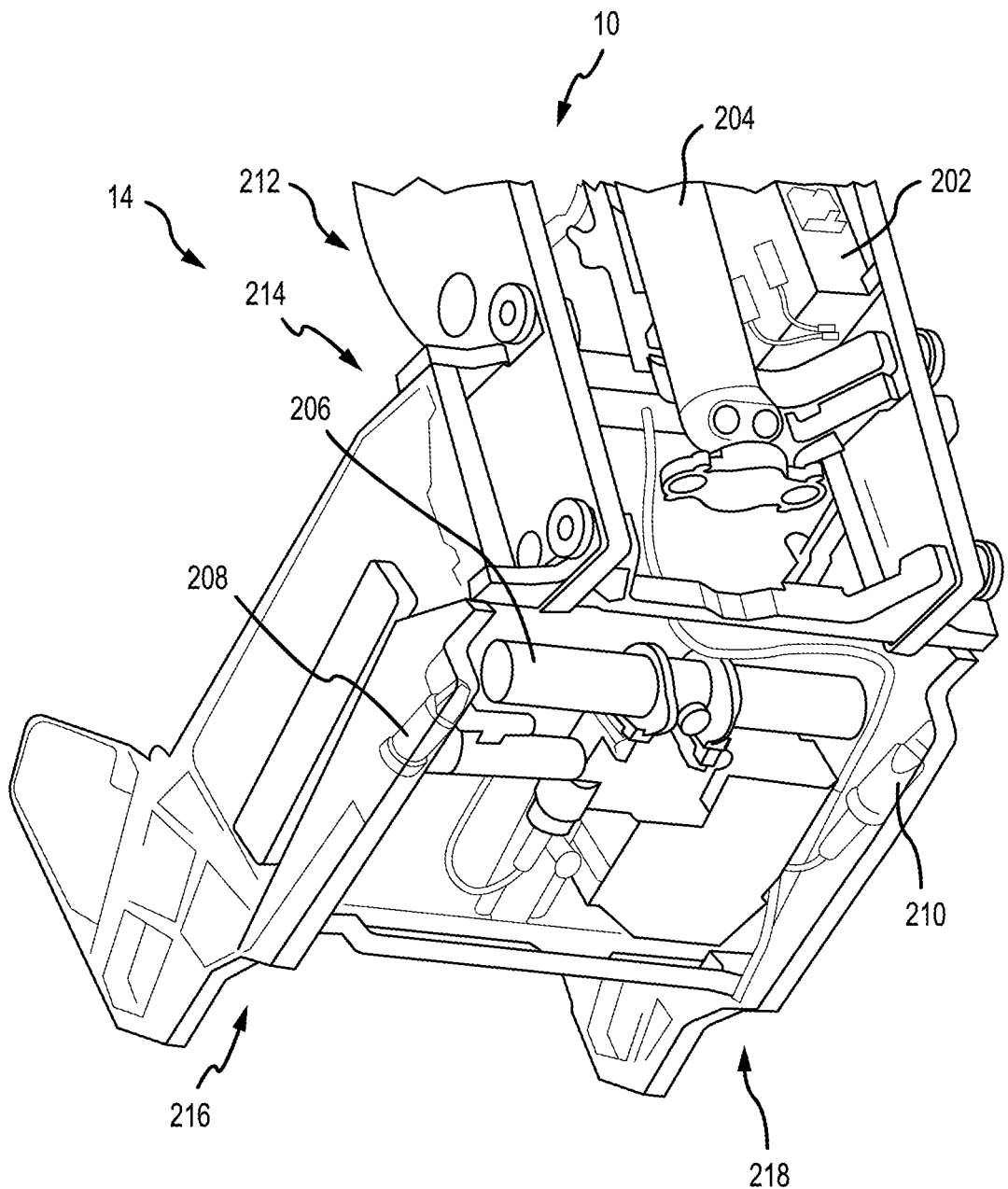
FIG. 2A illustrates a view of aspects of a seat back and a seat bucket of the ejection seat, in accordance with various embodiments.
Figure 2B:
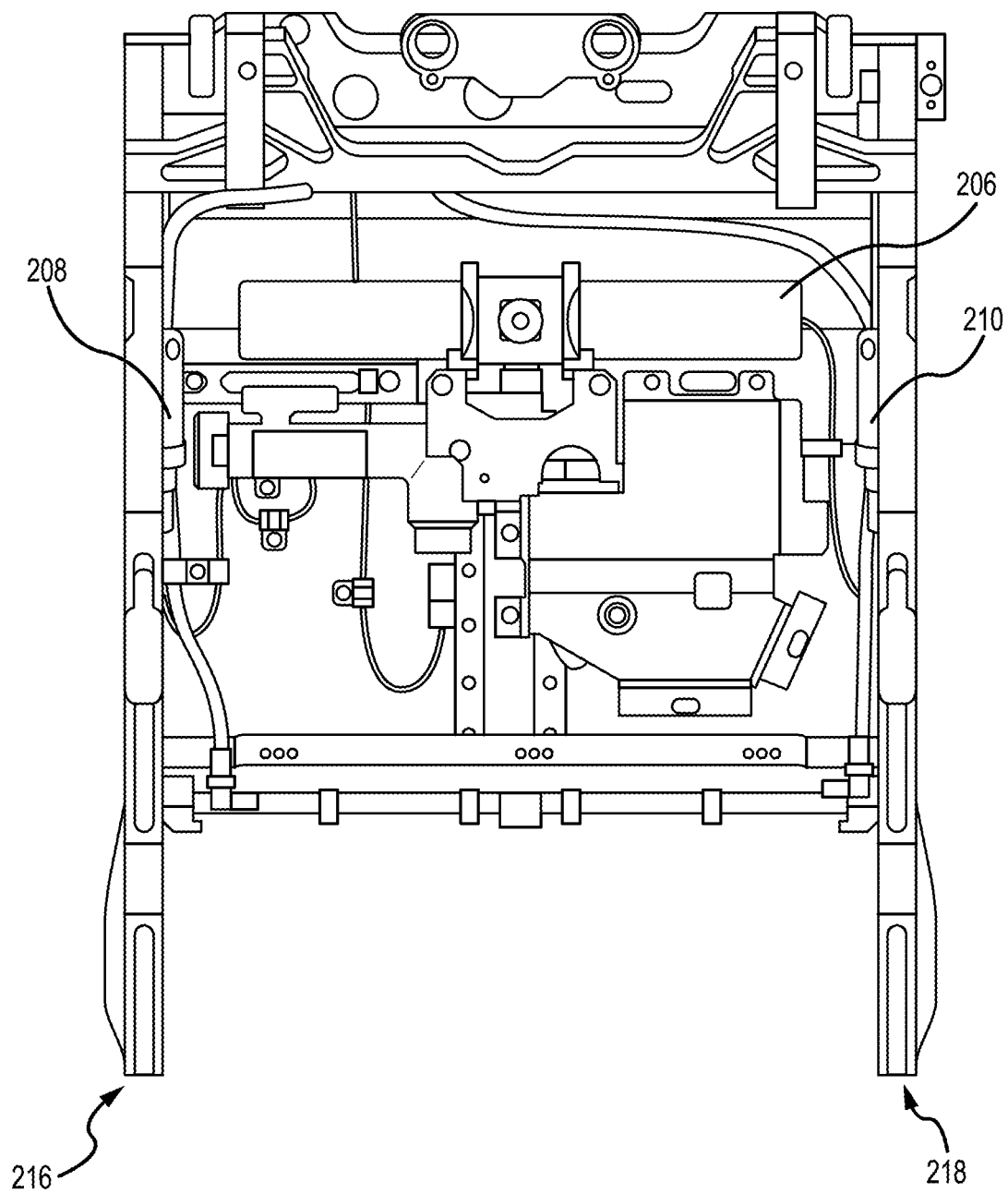
FIG. 2B illustrates an underneath view of aspects of the seat bucket of the ejection seat, in accordance with various embodiments.

With reference to FIG. 2A, the ejection seat 14 may include a seat back 212 and a seat bucket 214. A seat bucket 214 may be a portion of the ejection seat 14 that supports the occupant 16 (FIG. 1) while the seat back 212 may be a portion of the ejection seat 14 that supports a back of the occupant 16 (FIG. 1). Various components of the roll-stabilized aircraft ejection system 10 may be installed on the ejection seat 14. FIGS. 2A-B illustrate an embodiment of components of the roll-stabilized aircraft ejection system 10 installed on the ejection seat 14.

Turning now to FIGS. 2A-B, an ejection seat 14 is illustrated having a seat back 212 and having a seat bucket 214 with a first side 216 and a second side 218 that is opposite the first side 216. The ejection seat 14 may include a high energy catapult device 204. The high energy catapult device 204 is configured to generate the propellant 20 (FIG. 1) that expels the ejection seat 14 from the cockpit 18. The high energy catapult device 204 may include a rocket, a gas generator, a pneumatic device, a spring device, or a combination of such aspects. Moreover, the high energy catapult device 204 may operate in concert with other components of the roll-stabilized aircraft ejection system 10. For instance, the high energy catapult device 204 may operate in concert with a pitch stabilization and control assembly (STAPAC) device 206. A STAPAC device 206 may comprise a rocket that operates to further impel separation of the ejection seat 14 from the cockpit 18, to stabilize a pitching movement of the ejection seat 14, or to facilitate a combination of such effects. In various instances, the high energy catapult device 204 comprises a gas generator device on a seat back 212 that causes the initial expulsion of the ejection seat 14 from the cockpit 18 and also a rocket that fires to further impel the separation of the ejection seat 14 further away from the cockpit 18 and other aircraft 12 structures. Such a high energy catapult device 204 may be operated in concert with a STAPAC device 206 to provide pitch stability while the ejection seat 14 is separating from the cockpit 18 and other aircraft 12 structures.

The roll-stabilized aircraft ejection system 10 may include a trajectory divergence rocket motor (TDRM) 208. A TDRM 208 may be attached to the seat bucket 214. In various embodiments, a TDRM 208 is attached to the seat bucket 214 toward a first side 216 of the seat bucket 214. Thus, the TDRM 208 may provide thrust that impels the seat toward one side or another side. For instance, for a TDRM 208 attached to the seat bucket 214 toward a first side 216 of the seat bucket 214, the TDRM 208 may be oriented to provide thrust that impels the seat in a direction toward the first side 216.

The TDRM 208 may be emplaced adjacent a side of the seat bucket 214 that is chosen to impel the ejection seat 14 away from another ejection seat, such as for an aircraft with multiple crewmembers, during an ejection event. For instance, one crew member may occupy an ejection seat 14 having a TDRM 208 to impel the seat toward one side (e.g., a starboard side) of the vehicle upon ejection, while another crew member may occupy an ejection seat 14 having a TDRM 208 to impel the seat toward another side (e.g., a port side) of the vehicle upon ejection, so that a collision risk between the crew members during ejection is reduced.

In various embodiments, and particularly during ejection events where the ejection seat is occupied by a relatively lighter weight crew member, the TDRM 208 may also impart to the ejection seat a tendency to roll. For instance, as a TDRM 208 impels a seat toward a port side of an aircraft, the TDRM 208 may also impel the seat to rotate in a clockwise direction. Similarly, as a TDRM 208 impels a seat toward a starboard side of an aircraft, the TDRM 208 may also impel the seat to rotate in a counterclockwise direction. Such rotation may be harmful—increasing a risk of injury to a crew member and may introduce unwanted dynamics to a trajectory of an ejection seat.

Thus, in various embodiments, the roll-stabilized aircraft ejection system 10 may also include an active roll correction rocket motor 210. The active roll correction rocket motor 210 is provided to counteract the tendency to roll. For instance, an active roll correction rocket motor 210 may be installed on a seat bucket 214 toward an opposite side of the seat bucket 214 relative to the TDRM 208. For instance, for a seat bucket 214 having a TDRM 208 installed adjacent a first side 216, an active roll correction rocket motor 210 may be installed adjacent a second side 218 of the seat bucket 214, and vis-a-versa. In various embodiments, the active roll correction rocket motor 210 is a similar or an identical component to the TDRM 208 but is installed in a different location and/or different orientation. In this manner, a relative thrust impulse of the TDRM 208 and of the active roll correction rocket motor 210 may be matched so that a tendency to roll that is introduced by the TDRM 208 is canceled (e.g., at least partially ameliorated or decelerated) by the active roll correction rocket motor 210.

The roll-stabilized aircraft ejection system 10 may include an integral seat sequencer 202. The integral seat sequencer 202 may include a controller configured to activate, or refrain from activating of the various components of the roll-stabilized aircraft ejection system 10. The integral seat sequencer 202 may control relative and absolute timing of activation of the various components of the roll-stabilized aircraft ejection system 10. For example, the integral seat sequencer 202 may selectively activate the active roll correction rocket motor 210 upon detection of an undesirable rotational movement of the ejection seat 14 but may selectively decline to activate the active roll correction rocket motor 210 upon detection that no undesirable rotational movement of the ejection seat 14 is occurring.

Figure 3:
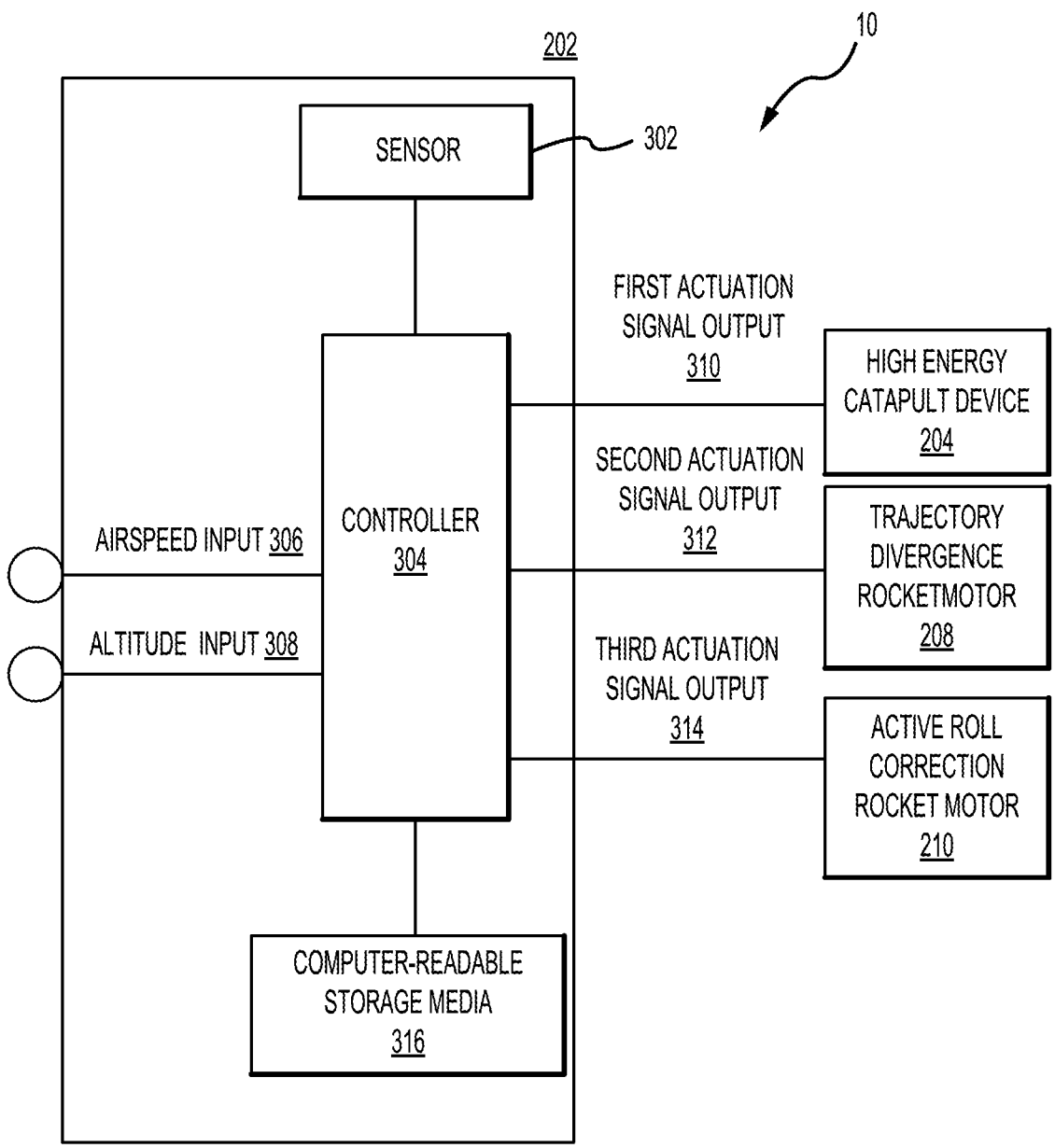
FIG. 3 illustrates a block diagram of various aspects of an integral seat sequencer of the ejection seat, in accordance with various embodiments.

Turning attention to FIG. 3, various details of the integral seat sequencer 202 are disclosed. For example, an integral seat sequencer 202 may include a controller 304. A controller 304 may include a processor, an application-specific integrated circuit (ASIC), a programmable logic controller (PLC), various logic components, logic gates, and the like, that is/are configured to receive inputs and generate outputs responsive to programming. For instance, a sensor 302 may be provided. The sensor 302 may provide data corresponding to a direction and a magnitude of a first movement of the roll-stabilized aircraft ejection system 10. The first movement may be an acceleration and/or an angular velocity, such as a roll rate. In various embodiments, the sensor 302 provides roll data corresponding to the rotational movement of the ejection seat 14 so that the controller 304 of the integral seat sequencer 202 may determine whether to selectively activate or decline to activate the active roll correction rocket motor 210 to ameliorate the rotational movement.

In various embodiments, the integral seat sequencer 202 further includes a computer-readable storage medium 316. The computer-readable storage medium 316 may include a memory that stores machine instructions for execution prior to, during, or after an ejection event. For example, computer code corresponding to sequencing of the different aspects of the roll-stabilized aircraft ejection system 10 and corresponding to whether to activate or decline to activate the different aspects, may be stored.

In various embodiments, the integral seat sequencer 202 includes an airspeed input 306. The airspeed input 306 comprises a connection of the controller 304 to one or more device on the seat such as a pitot device and/or barometric pitot device on the seat, or to other aircraft systems, avionics, sensors, data busses and/or the like so that data corresponding to an airspeed, a rate of change of airspeed, or the like, of the aircraft, is provided to the controller 304 of the integral seat sequencer 202. Similarly, the integral seat sequencer 202 may include an altitude input 308. The altitude input 308 comprises a connection of the controller 304 to one or more device on the seat such as a pitot device and/or barometric pitot device on the seat, or to other aircraft systems, avionics, sensors, data busses, and/or the like so that data corresponding to an altitude, a rate of altitude, change, or the like, of the aircraft, is provided to the controller 304 of the integral seat sequencer 202.

The controller 304 may, in response to one or more of the sensor 302, the airspeed input 306, and the altitude input 308, generate one or more actuation signal. For instance, a first actuation signal may be generated by the controller 304 on a first actuation signal output 310. The first actuation signal output 310 may comprise a connection of the integral seat sequencer 202 to the high energy catapult device 204. The first actuation signal may instruct the high energy catapult device 204 to activate or refrain from activation, to activate at a particular time or in a relative sequence relative to other aspects of the roll-stabilized aircraft ejection system 10. The first actuation signal may correspond to different thrust settings or durations for such an activation.

Similarly, a second actuation signal may be generated by the controller 304 on a second actuation signal output 312. The second actuation signal output 312 may comprise a connection of the integral seat sequencer 202 to the trajectory divergence rocket motor 208. The second actuation signal may instruct the trajectory divergence rocket motor 208 to activate or refrain from activation, to activate at a particular time or in a relative sequence relative to other aspects of the roll-stabilized aircraft ejection system 10. The second actuation signal may correspond to different thrust settings or durations for such an activation.

Moreover, a third actuation signal may be generated by the controller 304 on a third actuation signal output 314. The third actuation signal output 314 may comprise a connection of the integral seat sequencer 202 to the active roll correction rocket motor 210. The third actuation signal may instruct the active roll correction rocket motor 210 to activate or refrain from activation, to activate at a particular time or in a relative sequence relative to other aspects of the roll-stabilized aircraft ejection system 10. The third actuation signal may correspond to different thrust settings or durations for such an activation.

It is convenient to discuss several non-limiting example embodiments of the system and apparatus introduced above. For example, referring to the combination of FIGS. 1-3, in an example embodiment, a roll-stabilized aircraft ejection seat 14 may include a seat bucket 214 having a first side 216 and a second side 218 and may include a seat back 212. The seat bucket 214 is configured to support an occupant 16 and the seat back 212 extends away from the seat bucket 214 to support a back of the occupant 16. A high energy catapult device 204 is configured to expel the roll-stabilized aircraft ejection seat 14 from an aircraft 12 along a first trajectory in response to a first actuation signal from an integral seat sequencer 202. The high energy catapult device 204 may include a rocket motor attached to the seat back 212.

A trajectory divergence rocket motor 208 is attached to the seat bucket 214 and configured to modify the trajectory of the roll-stabilized aircraft ejection seat 14 in response to a second actuation signal from the integral seat sequencer 202 attached to the seat so that the roll-stabilized aircraft ejection seat 14 travels along a second trajectory which is a modification of the first trajectory. The second trajectory may include a rotational movement. The rotational movement may be an undesirable rotational movement induced by the trajectory divergence rocket motor 208.

In various embodiments, an active roll correction rocket motor 210 is attached to the seat bucket 214 and configured to ameliorate the rotational movement of the ejection seat in response to a third actuation signal from the integral seat sequencer 202.

The trajectory divergence rocket motor 208 is positioned toward a first side 216 of the seat bucket 214 and the active roll correction rocket motor 210 is positioned toward a second side 218 of the seat bucket 214 opposite the first side 216 of the seat bucket 214. The active roll correction rocket motor 210 ameliorates the rotational movement of the roll-stabilized aircraft ejection seat 14 imparted by the trajectory divergence rocket motor 208. In some instances, a pitch stabilization and control assembly (STAPAC) device 206 comprising a rocket motor is centered between the trajectory divergence rocket motor 208 and the active roll correction rocket motor 210 to increase a separation of the roll-stabilized aircraft ejection seat 14 from the aircraft 12 (such as by enhancing pitch stability and/or control) following the expelling of the roll-stabilized aircraft ejection seat 14 from the aircraft 12.

The trajectory divergence rocket motor 208 and the active roll correction rocket motor 210 may be similar rocket motors. The trajectory divergence rocket motor 208 and the active roll correction rocket motor 210 may be same rocket motors positioned on opposite sides of the seat bucket 214. The integral seat sequencer 202 comprises a controller 304 attached to the roll-stabilized aircraft ejection seat 14 and connected to the high energy catapult device 204, the trajectory divergence rocket motor 208, and the active roll correction rocket motor 210. The controller 304 transmits the first actuation signal, the second actuation signal, and the third actuation signal to the high energy catapult device 204, the trajectory divergence rocket motor 208, and the active roll correction rocket motor 210, respectively.

The integral seat sequencer 202 may have the controller 304 and a sensor 302 such as an accelerometer or other roll sensor providing a first data to the controller 304. The integral seat sequencer 202 may selectively transmit the third actuation signal to the active roll correction rocket motor 210 in response to the first data indicating a rotational movement exceeding a first magnitude. The integral seat sequencer 202 may selectively transmit the third actuation signal to the active roll correction rocket motor 210 in response to the first data indicating a rotational movement in a first direction. The first direction may be a movement of the seat back 212 concentrically about the seat bucket 214 in the first direction.

In a further embodiment, a roll-stabilized aircraft ejection system 10 is provided for installation on an aircraft ejection seat 14 having a high energy catapult device 204 configured to expel the ejection seat 14 from an aircraft 12. The roll-stabilized aircraft ejection system 10 may have a pair of rocket motors (208, 210) both attached to a seat bucket 214 of the ejection seat 14. A first rocket motor of the pair of rocket motors may be a trajectory divergence rocket motor (TDRM) 208 attached to the seat bucket 214 and configured to impel the ejection seat 14 in a direction away from at least one of (i) the aircraft 12 and (ii) a second aircraft ejection seat 14 of the aircraft 12. A second rocket motor of the pair of rocket motors may be an active roll correction rocket motor 210 configured to ameliorate a rotational movement of the aircraft ejection seat 14 induced by the first rocket motor (TDRM 208). The pair of rocket motors may be identical motors installed on opposite sides of an underside of the seat bucket 214 of the ejection seat 14. The first rocket motor may be positioned toward a first side 216 of the seat bucket 214 and the second rocket motor may be positioned toward a second side 218 of the seat bucket 214 opposite the first side 216 of the seat bucket 214.

The roll-stabilized aircraft ejection system 10 may have integral seat sequencer 202 comprising a controller 304 and a sensor 302 providing a first data to the controller 304. The integral seat sequencer 202 selectively activates the second rocket motor (active roll correction rocket motor 210) in response to the first data indicating a movement exceeding a first magnitude in a first direction. The sensor 302 may be an accelerometer or other roll sensor attached to the aircraft ejection seat 14. The first rocket motor and the second rocket motor may be identical motors.

Figure 4:
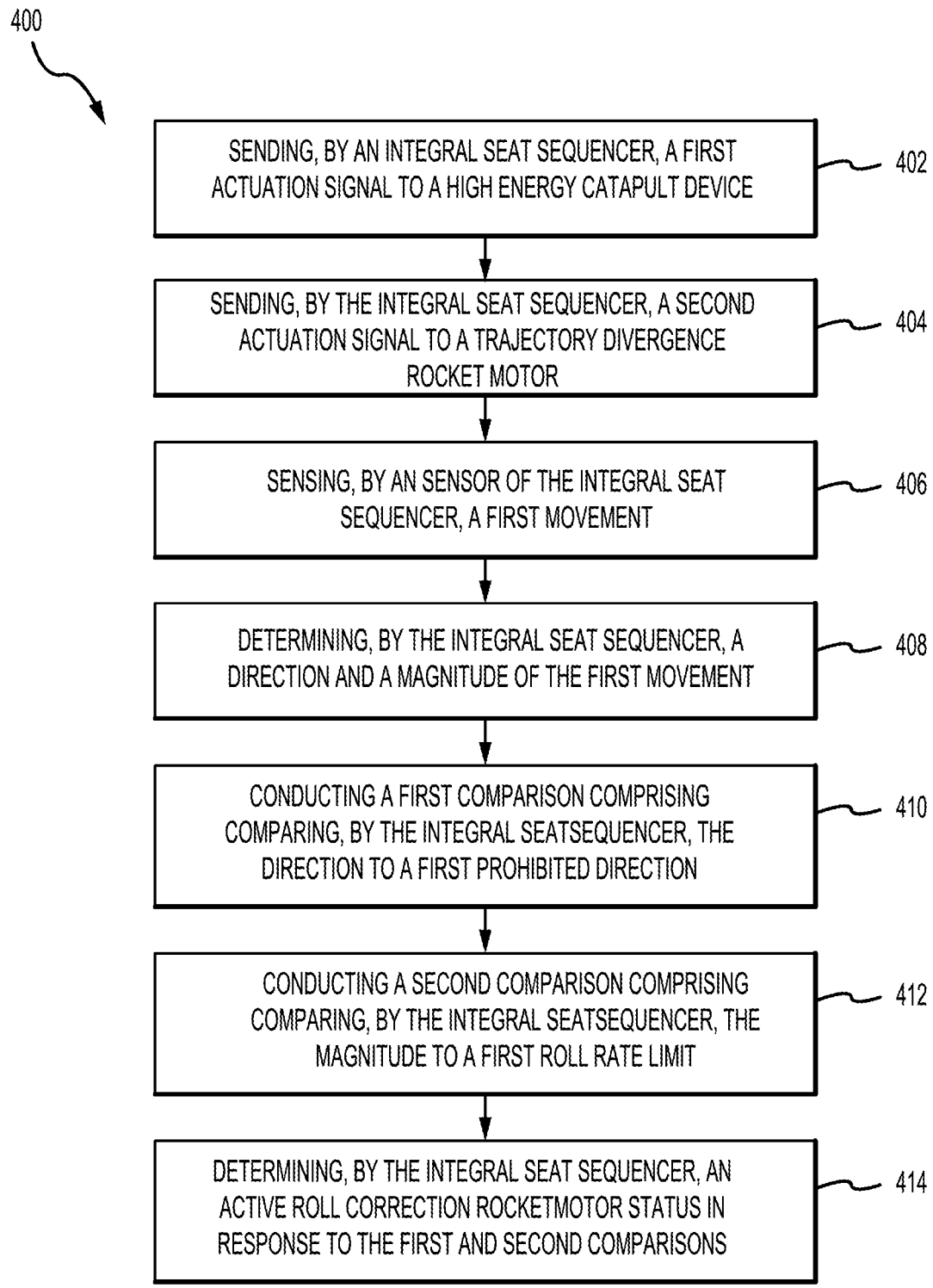
FIGS. 4 and 5 illustrate a method for roll stabilization of an aircraft ejection seat that can be implemented via a computer-readable storage medium of the integral seat sequencer, in accordance with various embodiments.

Turning now to FIG. 4, but with periodic reference to elements illustrated in FIGS. 1-3, a method 400 is illustrated. The method 400 may be for roll stabilization of an aircraft ejection seat 14 that can be implemented via the computer-readable storage medium 316 of the integral seat sequencer 202. Thus, in addition to a method 400, a computer-readable medium is also provided. The computer-readable medium may store instructions that when executed by a controller cause the controller to perform the method for roll stabilization of the aircraft ejection seat 14. The aircraft ejection seat 14 may have a seat bucket 214 configured to support an occupant 16 and a seat back 212 extending away from the seat bucket 214 to support a back of the occupant 16.

The method 400 may include sending, by an integral seat sequencer, a first actuation signal to a high energy catapult device configured to expel the ejection seat from an aircraft (block 402). The expelling the ejection seat may be along a first trajectory. The method may include sending, by the integral seat sequencer, a second actuation signal from the integral seat sequencer to a trajectory divergence rocket motor (block 404) The trajectory divergence rocket motor may be attached to the seat bucket and may be configured to modify the first trajectory of the ejection seat so that the ejection seat travels along a second trajectory. For instance, the trajectory divergence rocket motor may impel the ejection seat toward a starboard side of a vehicle, or toward a port side of the vehicle, such as to increase physical separation of multiple crew members who may be ejecting from the vehicle.

The method may include sensing, by a sensor of the integral seat sequencer, a first movement of the ejection seat (block 406). For instance, the ejection seat may be detected to be rotationally accelerating in connection with an undesired rotational movement. The trajectory divergence rocket motor may induce such a rotational movement.

The method may include determining, by the integral seat sequencer, a direction and a magnitude of the first movement (block 408). The method may also include conducting a first comparison comprising comparing, by the integral seat sequencer, the direction to a first prohibited direction (block 410). In various embodiments, the first prohibited direction may be a direction that moves the seat toward other ejection seats of other crewmembers, or toward an aircraft structure. In further embodiments, the first prohibited direction is any rotational direction. In yet further embodiments, the first prohibited direction is any rotational direction that the active roll correction rocket motor is oriented to ameliorate and/or counteract. The method may include conducting a second comparison comprising comparing, by the integral seat sequencer, the magnitude to a first roll rate limit (block 412). For instance, the magnitude may be determined to exceed a predetermined first roll rate limit.

Figure 5:
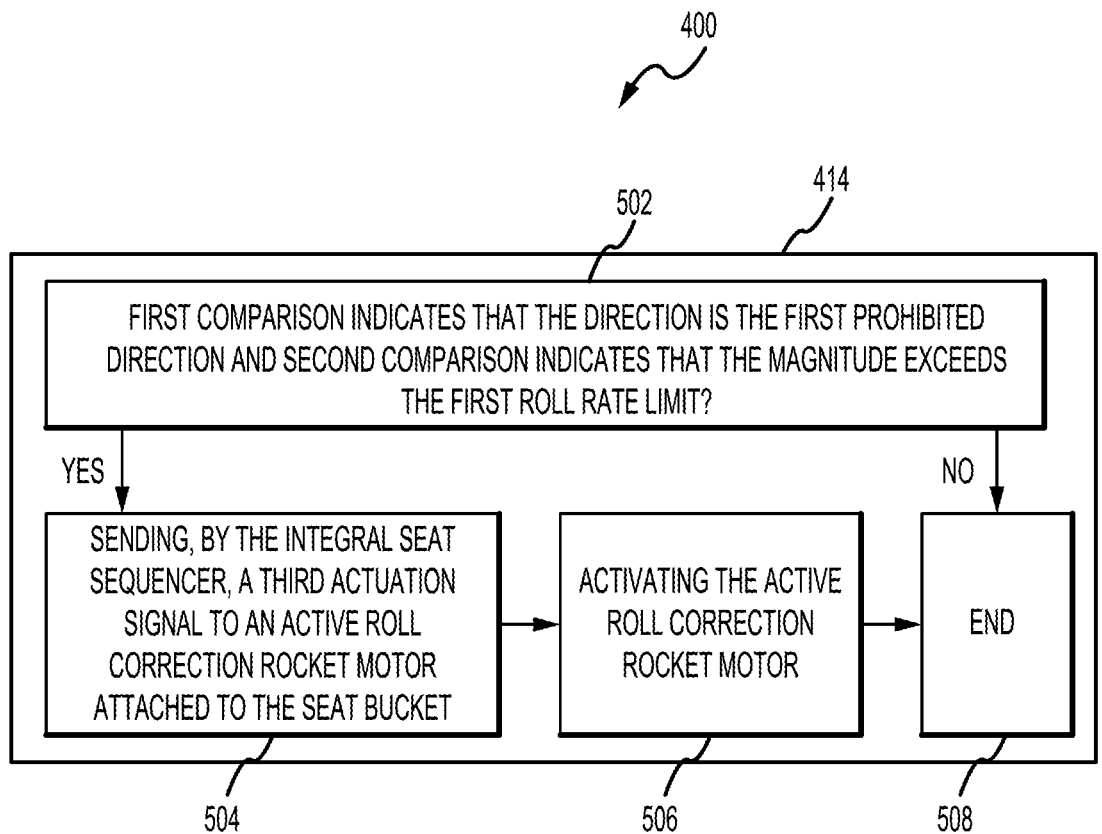

The method may include determining, by the integral seat sequencer, an active roll correction rocket motor status in response to the first comparison and the second comparison (block 414). For instance, the status may be to activate the active roll correction rocket motor. The status may be to refrain from activating the active roll correction rocket motor. In the execution of block 414, the status may be determined by comparisons. For instance, with additional reference to FIG. 5, in various embodiments, in response to the first comparison indicating that the direction is the first prohibited direction and the second comparison indicating that the magnitude exceeds the first roll rate limit (block 502) then the integral seat sequencer may send a third actuation signal to an active roll correction rocket motor attached to the seat bucket (block 504). The active roll correction rocket motor may then activate in response to receiving by the active roll correction rocket motor, the third actuation signal (block 506), after which the method 400 ends (block 508). Alternatively, in response to the first comparison not indicating that the direction is the first prohibited direction and/or the second comparison not indicating that the magnitude exceeds the first roll rate limit (block 502), then the method may end without activation of the active roll correction rocket motor (block 508).

In various embodiments of the method, the activating the roll correction rocket motor is after an activating of the trajectory divergence rocket motor. Moreover, in various embodiments, the sensing the first movement is during travel of the ejection seat along the second trajectory.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 115(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ejection seat comprising:
   a seat bucket configured to support an occupant;
   a seat back extending away from the seat bucket;
   a high energy catapult device comprising a gas generation device and a rocket, the high energy catapult device configured to expel the ejection seat from an aircraft along a first trajectory in response to a first actuation signal from an integral seat sequencer corresponding to a first thrust duration;
   a trajectory divergence rocket motor attached to the seat bucket and configured to modify the first trajectory of the ejection seat in response to a second actuation signal from the integral seat sequencer attached to the seat so that the ejection seat travels along a second trajectory; and
   an active roll correction rocket motor attached to the seat bucket and configured to ameliorate a rotational movement of the ejection seat in response to a third actuation signal from the integral seat sequencer, wherein at least one of the second actuation signal or the third actuation signal corresponds to a second thrust duration that is different from the first thrust duration.

2. The ejection seat according to claim 1, wherein the trajectory divergence rocket motor is positioned toward a first side of the seat bucket and the active roll correction rocket motor is positioned toward a second side of the seat bucket opposite the first side of the seat bucket.

3. The ejection seat according to claim 2, wherein the active roll correction rocket motor ameliorates the rotational movement of the ejection seat imparted by the trajectory divergence rocket motor.

4. The ejection seat according to claim 1, wherein the integral seat sequencer comprises a controller attached to the ejection seat and connected to the high energy catapult device, the trajectory divergence rocket motor, and the active roll correction rocket motor to transmit the first actuation signal, the second actuation signal, and the third actuation signal.

5. The ejection seat according to claim 1, further comprising a pitch stabilization and control assembly (STAPAC) device comprising a rocket motor centered between the trajectory divergence rocket motor and the active roll correction rocket motor to increase a separation of the ejection seat from the aircraft following the expelling of the ejection seat from the aircraft.

6. The ejection seat according to claim 1, wherein the integral seat sequencer comprises a controller and an accelerometer providing a first acceleration data to the controller, and wherein the integral seat sequencer selectively transmits the third actuation signal to the active roll correction rocket motor in response to (i) the first acceleration data exceeding a first magnitude and (ii) the first acceleration data indicating the rotational movement of the seat back concentrically about the seat bucket in a first direction.

7. The ejection seat according to claim 1, wherein the trajectory divergence rocket motor and the active roll correction rocket motor are similar rocket motors.

8. The ejection seat according to claim 1, wherein the trajectory divergence rocket motor and the active roll correction rocket motor are same rocket motors positioned on opposite sides of the seat bucket.

9. The ejection seat according to claim 1, wherein the high energy catapult device comprises a rocket motor attached to the seat back.

10. A roll stabilization system for installation on an ejection seat having a high energy catapult device comprising a gas generation device and a rocket, the high energy catapult device configured to expel the ejection seat from an aircraft, the roll stabilization system comprising:
a pair of rocket motors both attached to a seat bucket of the ejection seat,
wherein a first rocket motor of the pair of rocket motors comprises a trajectory divergence rocket motor attached to the seat bucket and configured to impel the ejection seat in a direction away from at least one of (i) the aircraft and (ii) a second aircraft ejection seat of the aircraft, and
wherein a second rocket motor of the pair of rocket motors comprises an active roll correction rocket motor configured to ameliorate a rotational movement of the ejection seat induced by the first rocket motor.

11. The roll stabilization system according to claim 10, wherein the pair of rocket motors comprise identical motors installed on opposite sides of an underside of the seat bucket of the ejection seat.

12. The roll stabilization system according to claim 10, wherein the first rocket motor is positioned toward a first side of the seat bucket and the second rocket motor is positioned toward a second side of the seat bucket opposite the first side of the seat bucket.

13. The roll stabilization system according to claim 10, further comprising an integral seat sequencer comprising a controller and a sensor providing a first acceleration data to the controller, wherein the integral seat sequencer selectively activates the second rocket motor in response to the first acceleration data exceeding a first magnitude in a first direction.

14. The roll stabilization system according to claim 13, wherein the sensor comprises an accelerometer attached to the ejection seat.

15. The roll stabilization system according to claim 10, wherein the first rocket motor and the second rocket motor are identical motors.

16. A computer-readable medium storing instructions that when executed by a controller cause the controller to perform a method for roll stabilization of an ejection seat having a seat bucket configured to support an occupant and a seat back extending away from the seat bucket to support a back of the occupant, the method comprising:
sending, by an integral seat sequencer, a first actuation signal to activate a high energy catapult device configured to expel the ejection seat from an aircraft along a first trajectory;
sending, by the integral seat sequencer, a second actuation signal from the integral seat sequencer to activate a trajectory divergence rocket motor attached to the seat bucket and configured to modify the first trajectory of the ejection seat so that the ejection seat travels along a second trajectory;
sensing, by a sensor of the integral seat sequencer, a first movement of the ejection seat;
determining, by the integral seat sequencer, a direction and a magnitude of the first movement;
conducting a first comparison comprising comparing, by the integral seat sequencer, the direction to a first prohibited direction;
conducting a second comparison comprising comparing, by the integral seat sequencer, the magnitude to a first roll rate limit; and
determining, by the integral seat sequencer, an active roll correction rocket motor status in response to the first comparison and the second comparison;
sending, by the integral seat sequencer, a third actuation signal to activate an active roll correction rocket motor attached to the seat bucket, in response to the first comparison indicating that the direction is the first prohibited direction and in response to the second comparison indicating that the magnitude exceeds the first roll rate limit.

17. The computer-readable medium according to claim 16, wherein the method further comprises:
activating the active roll correction rocket motor in response to receiving by the active roll correction rocket motor, the third actuation signal.

18. The computer-readable medium according to claim 17, wherein the activating the active roll correction rocket motor is after an activating of the trajectory divergence rocket motor.

19. The computer-readable medium according to claim 16, wherein the sensing the first movement is during travel of the ejection seat along the second trajectory.

\* \* \* \* \*